Dec. 19, 1933.   R. O. BEARDSLEY   1,939,643
SCREW THREAD GAUGE
Filed June 5, 1931
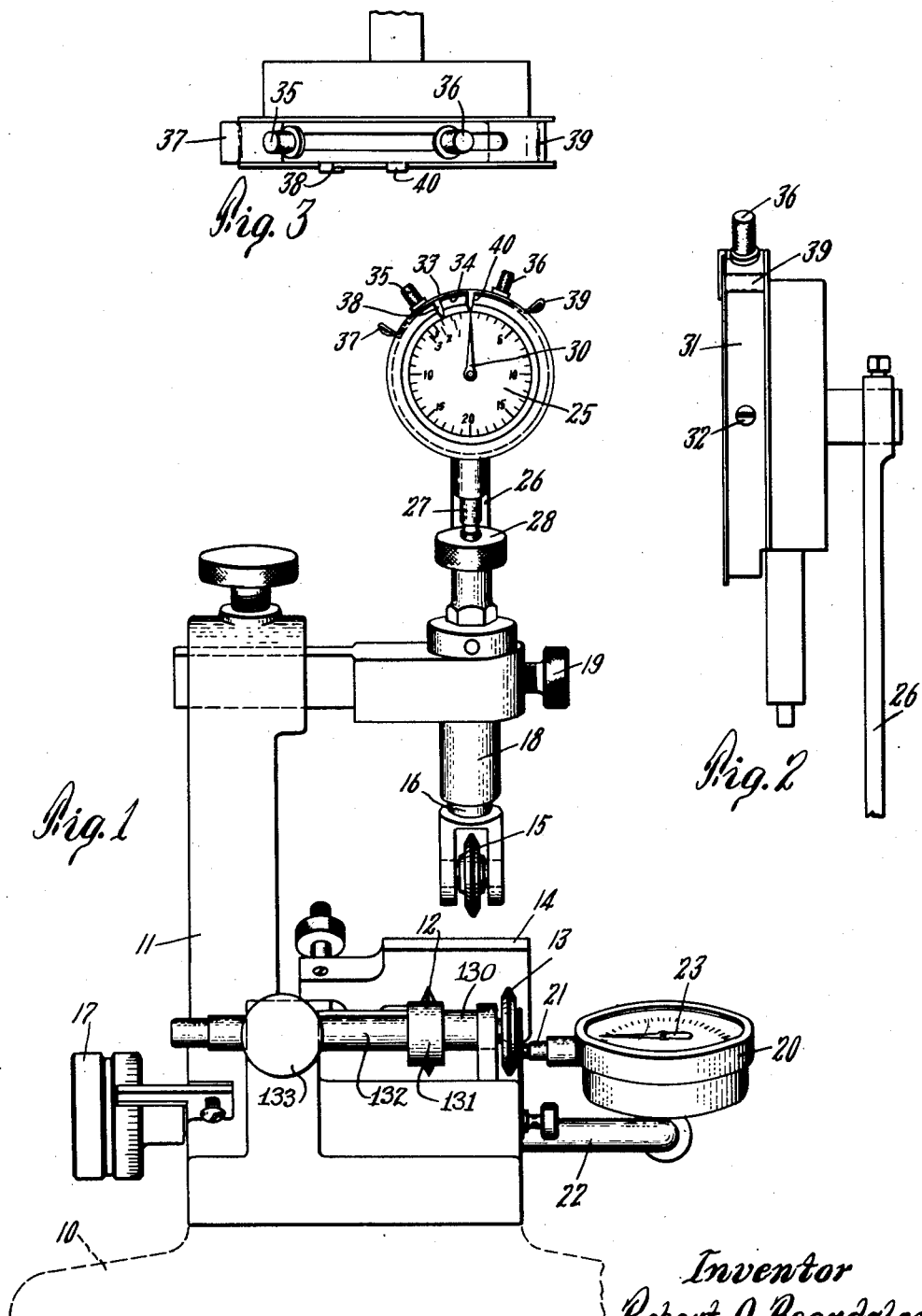

Patented Dec. 19, 1933

1,939,643

UNITED STATES PATENT OFFICE 1,939,643

SCREW THREAD GAUGE

Robert O. Beardsley, Springfield, Vt., assignor to Jones & Lamson Machine Company, Springfield, Vt., a corporation of Vermont Application June 5, 1931. Serial No. 542,298

3 Claims. (Cl. 33—199)

This invention relates to apparatus for gauging screw threads, somewhat similar to the gauging apparatus described and claimed in my copending application Serial No. 462,769, filed June 21, 1930, and more particularly to an improved indicator for showing errors of pitch diameter. According to the invention, this indicator is adapted particularly for use in conjunction with another somewhat similar indicator, the latter being employed to indicate errors of lead over a predetermined number of turns of a screw thread.

In the manufacture of screw threaded elements, such as bolts, screws, nuts, etc., there is always a possibility of errors creeping in. These errors are chiefly due to wearing of the cutting edges of the die chasers which cut the threads, and to wearing or faulty adjustment of parts of the machine which carries the thread cutting dies. The most frequent error encountered in the manufacture of screw-threaded articles is that of pitch diameter. If the pitch diameter is larger than the maximum tolerated magnitude, the bolt or screw will fail to enter a corresponding nut. If the pitch diameter is smaller than the tolerated limit, the engagement between the threads of the bolt or screw and the corresponding nut is somewhat limited so that the threads are liable to strip if the parts are subjected to severe stresses.

In many branches of manufacture, such, for example, as making aeroplanes where weight is an important factor, it is vital that every screw and bolt shall be of adequate strength in proportion to its size. To this end it is necessary that the thread of every bolt and screw be carefully tested to see that it will receive a nut of corresponding size and that every turn of the thread will do its full duty in holding the bolt and nut against impressed stresses.

The second type of error most commonly encountered in the manufacture of screw threaded articles is that of lead error. This may arise from inaccurate rate of axial feed of the screw-cutting die as it revolves. The effect of lead error on the engagement of a bolt or screw with a corresponding nut is to throw the entire load upon one or two or more turns of the thread, according to the amount of lead error present. When a nut is set up tightly on a bolt, there is a certain amount of give or "flow" of the metal of the threads, which increases the number of turns engaged, but the load is chiefly carried by the turns first engaged when the nut is screwed onto the bolt. As it is practically impossible, from a manufacturing point of view, to produce bolts and nuts with perfect threads, definite limits of tolerance have been defined for various classes of screw threaded objects. Where the errors are small, it is sometimes true that an error of lead may be to some extent offset by an error of pitch diameter. If lead error is present in a screw which is accurately correct as to pitch diameter, it is obvious that it will be difficult, if not impossible, for such a screw to be inserted in a corresponding nut, owing to the fact that the spacing of the turns of thread is incorrect, so that the threads of the bolt and nut soon bind. Thus the virtual effect of lead error is similar to an oversize pitch diameter, since it tends to cause the bolt to bind in or refuse to enter a nut. For this reason, if the pitch diameter is less than the correct value, it tends to compensate for any lead error which may be present. It is evident that lead error is additive with each turn of the thread, so that a lead error which would be insignificant for a thin nut embracing two or three turns of thread might be impossible if the same bolt were used with a thick nut embracing a considerably greater number of turns of thread. Hence the compensating value of undersize pitch diameter depends for its effectiveness upon the number of turns of thread over which the lead error is measured. Such lead error may be measured in terms of units of length such as .001" and the errors of pitch diameter may also be measured in similar units. In a standard screw thread, the flanks make an angle of approximately sixty degrees with each other. This being so, an error of one unit of length means that the flank of one of the turns of thread, spaced a predetermined number of turns from a point of reference on the screw, is one unit of length removed axially from its correct position relative to the point of reference. To compensate for that error, it would be necessary to cut away a flank face of this turn of the thread sufficiently to restore the face at the point of measurement to its correct position. If this cutting operation were actually carried out, the shaving off of a chip from the flank of a turn of thread having an axial dimension of one unit would result in a decrease of the pitch diameter by this unit multiplied by the square root of three, this relation arising from the 60° shape of the thread. In other words, in order to offset a unit error of lead, the pitch diameter must be 1.732 units under size.

According to the present invention a pair of indicators are provided for measuring respectively lead error and pitch diameter error. The indicator for lead error is preferably calibrated in terms of any convenient unit of length such as .001". The indicator for pitch diameter error is preferably calibrated in similar units, and may be additionally calibrated in units which are 1.732 times the adopted unit of length. Thus, after the lead error, if any, has been read on one indicator, the second scale of the other indicator shows at a glance whether or not the pitch diameter error is of such a kind and size as to sufficiently compensate for the lead error present.

In order further to facilitate the determination of the fitness of a screw for service, I may also provide on the indicator of pitch diameter, a pair of adjustable elements adapted to show limits of tolerance for pitch diameter thicknesses. An indicator thus equipped greatly reduces the chances of acceptance of a defective bolt or screw and also enables an inspector at a glance to get the important facts concerning the errors of a screw thread by which its fitness is determined.

For a more complete understanding of the invention, reference may be had to the disclosure thereof in the following description and on the drawing, of which,—

Figure 1 is an elevation of a screw threaded gauge embodying the invention.

Figure 2 is a side elevation of an indicator for showing errors of pitch diameter.

Figure 3 is a plan view of the same.

The gauge as a whole is preferably mounted on a solid base 10 and includes a substantial frame 11 on which is mounted in parallel planes a pair of disks 12 and 13. Each disk is beveled on both sides at its periphery, the beveled faces meeting at an angle of sixty degrees so as to fit into the valley between adjacent turns of a standard screw thread. As described in my co-pending application Serial No. 462,769, the disk 12 is preferably adjustably fixed against axial movement, the disk 13 being free to move a small distance axially. To this end, the disk 13 may be fixed to the end of a shaft 130 which is slidably mounted in suitable bearing members on the frame 11. The disk 12 is loosely journaled on this shaft so as to be slidable axially thereon. It may be held against axial movement by a notched clamping block 131 which is fixed on the end of a shaft 132 and is journaled in a portion of the frame 11. The shaft 132 is parallel to the shaft 130 and may be secured in adjusted position as by a set screw 133, the head of which appears in Figure 1. Behind these disks is an abutment or back-rest 14 against which the bolts or screws to be tested may rest when in position for testing. Above and between the disks 12 and 13 is a presser foot which, as shown, may be in the form of a disk 15 carried by a spring pressed plunger 16. The back-rest 14 is preferably adjusted by a knurled head 17 acting through a pinion and rack (not shown) to suitable positions corresponding to bolts of different sizes, so that when a bolt to be tested is pushed between the disks 12, 13 and 15, its axis will just pass beyond the plane containing the axes of the three disks. The plunger 16 and its spring are mounted in a suitable housing 18 which is preferably held in axially adjusted position as by a set-screw 19, so that the plunger is pushed upwardly as a bolt is moved into position for testing. Thus the spring-pressed plunger 16 holds the bolt firmly in position for testing and presses it into firm engagement with the peripheries of the disks 12 and 13. As the disk 12 is held against axial movement, the axial position of the disk 13, when in engagement with the bolt under test, will be determined by the presence or absence of lead error in the bolt. If the error of pitch diameter is present, this will result in a greater or lesser upward displacement of the plunger 16. As these measuring movements of the disk 13 and the plunger 16 are of small actual magnitude, it is practically necessary to magnify such movements considerably. To this end a suitable indicator 20 may be provided with a movable plunger 21 resting against the face of the disk 13. This indicator 20 may be of any suitable type, a dial type being illustrated on the drawing. The indicator may be supported from the main frame of the apparatus, as by a suitable bracket 22. The movable index 23 of the indicator is adapted to magnify the axial movement of the plunger 21 so that units of length such as .001" may be easily read on the dial of the indicator.

A second indicator 25 may be provided to facilitate the observation of errors in pitch diameter. As shown, this indicator may be supported by a suitable bracket 26 and may have a plunger 27 resting upon the upper end 28 of the plunger 16. The indicator is provided with an index 30, the movement of which is greatly magnified by means well known in the art, so that small movements of the plunger 27 are easily read on the dial of the indicator. The scale of the indicator 25 is preferably calibrated in the same units as that of the indicator 20, so that the absolute errors of lead and pitch diameter may be directly compared in similar units.

In addition to the scale to indicate absolute error of pitch diameter, I may provide a second scale which, as shown in Figure 1, may be concentric with the first scale and be radially inward therefrom. This second scale may be calibrated in units which are substantially 1.732 times as great as the units of the other scale, this relation being suitable for the measurement of screw threads of standard shape.

The case indicator 25 may be fitted with a ring 31 which may be secured thereto as by a set-screw 32. This ring is preferably channeled to receive a pair of sliding elements 33 and 34 which are adjustably fixed therein as by a pair of set screws 35 and 36. The sliding member 33 may be provided with a suitable finger-piece 37 and a marker 38. The sliding element 34 may likewise be provided with a finger-piece 39 and a marker 40. When the set screws 35 and 36 are loosened, the sliding elements may be manipulated to move the pointers 38 and 40 to any desired positions to indicate tolerance limits for screws of any selected class of fit. The positions of these markers may then be fixed by setting up on the screws 35 and 36.

In using this gauge apparatus, a screw to be tested is pushed horizontally between the upper disk 15 and the lower disks 12 and 13 until it brings up against the back-rest 14. The spring-pressed plunger 16 presses the screw firmly against the lower disks so that the latter are well seated in spaced turns of the thread of the bolt under test. Any lead error present in the thread will result in the axial displacement of the disk 13 when the disk 12 is fixed against axial movement and, therefore, serves as a definite point of reference. Axial movement of the disk 13 likewise results in axial movement of the plunger 21, this movement being magnified by the indicator 20, resulting in considerably greater movement on the part of the index 23. Thus the lead error may be at once observed from the dial of the indicator 20. If lead error is present, it is necessary that the pitch diameter be sufficiently undersized to compensate for it. The variation of pitch diameter from standard may be thereupon noted by inspection of the indicator 25. In the indicator illustrated on the drawing, the index 30 shows zero error, that is, a pitch diameter exactly equal to that on a plug gauge. Movement of the index toward the right would indicate an oversize pitch diameter, movement toward the left indicating undersize pitch diameter. The outer scale divisions show at once the absolute error of pitch diameter in a predetermined unit of length. The inner scale shows the units of undersize error of pitch diameter which would compensate for corresponding units of lead error read on the indicator 20. If, for example, a screw thread is observed to have a lead error of .001", the indicators 20 and 25 being calibrated in terms of this unit, there must be an under size error of pitch diameter sufficient to move the index 30 toward the left to or beyond the first inner scale division but not beyond the marker 38. If a lead error of .002" is indicated on the indicator 20, the bolt must be discarded, since two compensating units of pitch diameter error would bring the index 30 outside of the zone of tolerance indicated by the markers 38 and 40 for the selected class of fit.

It is evident that various changes in form and structure may be made without departing from the spirit and scope of the invention as defined by the following claims.

I claim:
1. In apparatus for gauging screw threads, an indicator having a movable index, a cooperating scale calibrated to denote absolute error of pitch diameter in terms of a predetermined unit of length, a pair of adjustable elements marking limits of tolerance for pitch diameters, and a second scale adjacent to the first and in cooperative relation to said index, said scale denoting units of pitch diameter error adapted to compensate for errors of lead measured in terms of said predetermined unit of length.

2. In gauging apparatus for screw threads of standard contour, an indicating device having an index and a cooperating scale calibrated to represent absolute error of pitch diameter, and a second scale cooperatively related to said index, said second scale having divisions with about 1.732 times the spacing of the divisions of the first said scale.

3. In a gauging device capable of indicating the lead error of a screw thread, an indicator having a movable index, a cooperating scale calibrated to denote absolute error of pitch diameter in terms of a predetermined unit of length, and a second scale in cooperative relation to said index, said second scale denoting units of pitch diameter error adapted to compensate for errors of lead measured in terms of said predetermined units of length.

ROBERT O. BEARDSLEY.